D. JANKOWER.
CYLINDRICAL INTEREST CALCULATOR.
APPLICATION FILED MAY 28, 1918.

1,333,078.

Patented Mar. 9, 1920.
3 SHEETS—SHEET 3.

Witnesses.
J. Hart Robertson
Geo. Emrich

David Jankower, Inventor

UNITED STATES PATENT OFFICE.

DAVID JANKOWER, OF NEW YORK, N. Y.

CYLINDRICAL INTEREST-CALCULATOR.

1,333,078.   Specification of Letters Patent.   Patented Mar. 9, 1920.

Application filed May 28, 1918. Serial No. 237,090.

*To all whom it may concern:*

Be it known that I, DAVID JANKOWER, a citizen of the United States, and resident of New York city, in the county of New York and State of New York, have invented certain new and useful Improvements in Cylindrical Interest-Calculators, of which the following is a specification.

The object of this invention is to utilize an interest-bearing cylinder carrying a given, or fixed, number of interest sums such as would be used in computing interest on a principal sum at a single rate of interest only, so that the said interest-bearing cylinder will, without the addition of extra interest sums, but when used in conjunction with a second cylinder, having a series of principal-carrying blades, serve for the computation of interest at varying rates from one-half of one per cent. upward.

The apparatus is so arranged that only the exact amount that interest is wanted on will show at a determined observation point, under, and in downward line with which will also be shown the exact interest, doing away largely with the liability of error, as is common when the open tables or books in use are employed.

Figure 1:
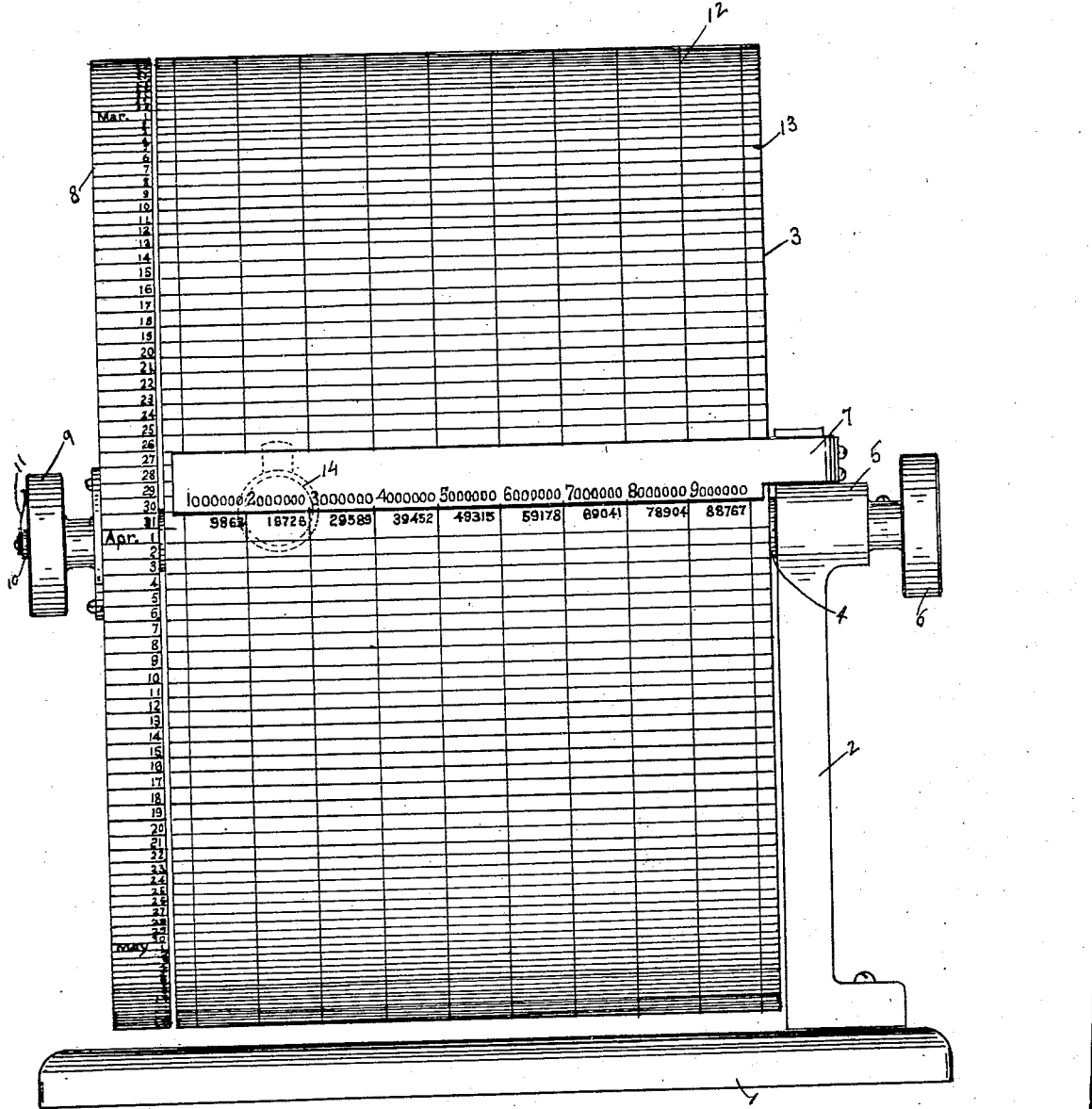
Figure 2:
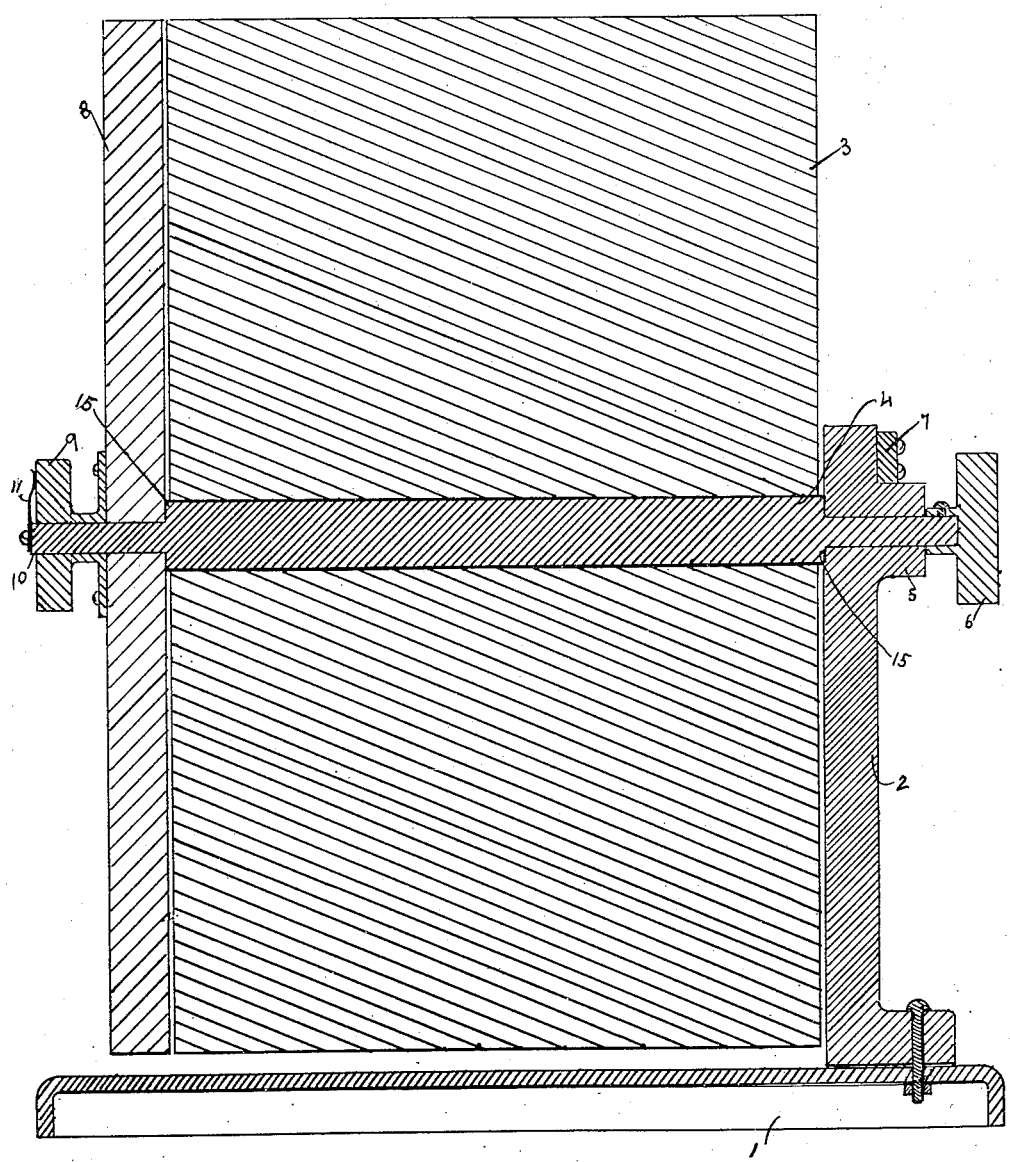
Figure 4:
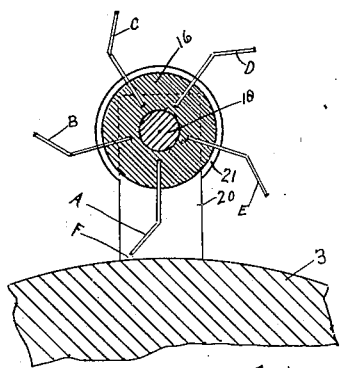
Figure 3:
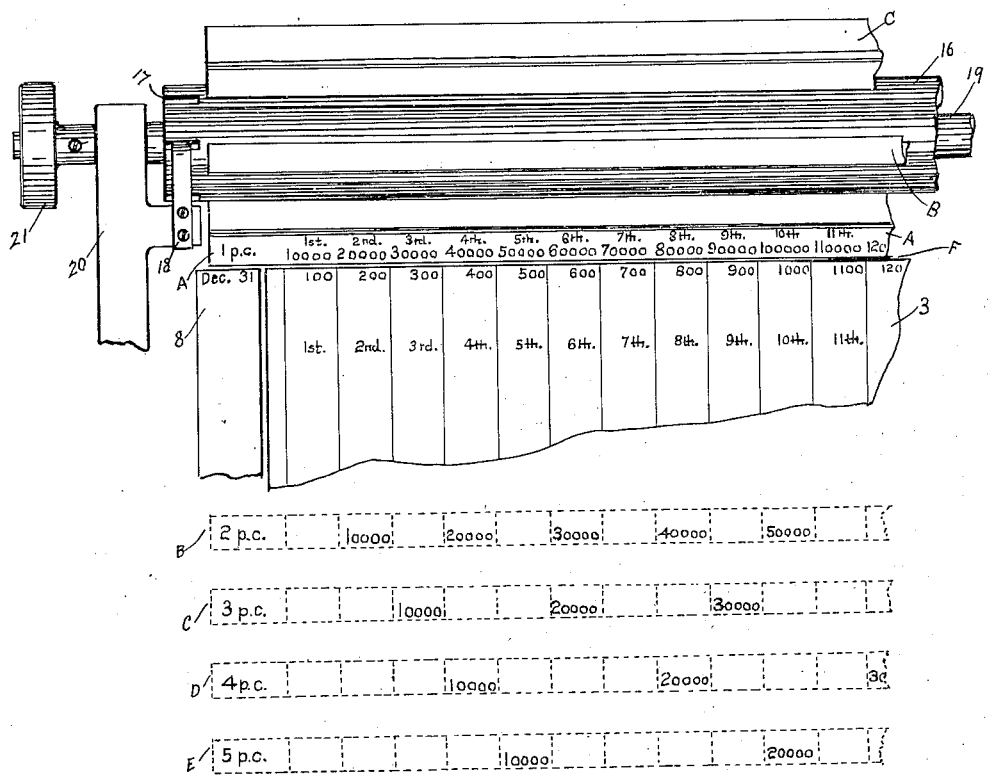

In the accompanying drawings, which are partially diagrammatic, Figure 1, is a front elevation of an apparatus as arranged for a single or fixed rate of interest; Fig. 2, a cross-section of the same; Fig. 3, a view of part of Fig. 1, but arranged (by means of a percentage cylinder) to give interest at any rate from one-half per cent. upward. Fig. 4, a cross-section of percentage cylinder. Similar numerals refer to similar parts throughout the different views except where a few letters are used in Figs. 3 and 4.

A description of the apparatus as arranged for a single rate of interest will first be given and attention is called to Fig. 1, in which 1, is the base; 2, standard secured to same; 3 interest-bearing cylinder; 4, shaft passing through cylinder 3 and rigidly secured to same; 5, bearing for shaft 4 at upper part of standard 2; 6, hand-wheel, rigidly secured to shaft 4, for the purpose of revolving cylinder 3; 7, principal-carrying or percentage bar secured to extension of standard 2 and arranged in proximity to cylinder 3 but not to contact with same; 8, date-cylinder mounted freely on extension of shaft 4 and frictionally pressed in contact with shoulder 15 on same by means of flat pressure-spring 11; 9, hand-wheel secured to side of date-cylinder 8 for the purpose of moving the said date-cylinder 8 relatively to interest-bearing cylinder 3; 10, extension of shaft 4; 11, flat-spring rigidly secured to end of extension 10 of shaft 4 and having its free end pressing on the outer side of hand-wheel 9; 12, lines passing completely around cylinder 3 for the purpose of dividing the interest-sums into columns in downward line with the principal-sums on bar 7; 13, longitudinal lines indicating the different rows of interest-sums on cylinder 3; 14, sliding microscope, shown in dotted lines.

When the hand-wheel 9 on date-cylinder 8 is moved in opposition to hand-wheel 6 connected to cylinder 3, the friction of spring 11 is overcome so that any day of the year on the said date cylinder 8 can be quickly brought into longitudinal line with any one of the 365 rows of interest-sums on the said cylinder 3 and when the said hand-wheel 9 is released and the hand-wheel 6 only rotated, cylinder 3, cylinder 8, and hand-wheel 9, will rotate with it as a single unit.

Both the interest-bearing cylinder and the date-cylinder may be made of wood, metal, or other material and the interest results for cylinder 3 as well as the dates for cylinder 8 may be printed on paper and then be cemented around their respective cylinders.

For the more simple illustration of the method of calculation as used in the present invention only a single longitudinal row of interest sums is shown on cylinder 3, each individual sum being directly underneath, and in downward or latitudinal line with the individual principal-sum on bar 7 for which it is the interest.

It is understood that 365 longitudinal rows of interest sums, arranged co-equally around the cylinder, are used in practice, the same, with the exception of the single row referred to, being indicated in the drawing Fig. 1, by the numerals 13.

To condense the size of the apparatus and make it possible, when required, to arrange for extended calculations without undue lengthening of the apparatus, the numerals will in practice be smaller than shown in the drawings, in which case a sliding microscope is used so that readings can be quickly and easily taken.

To show the method of operation it will be supposed that the interest on $90,000.00 (9th section of bar 7) at 4% per annum from Jan. 1st to March 31st has to be found, in which case the date "Dec. 31st" on cylinder 8, is lined up with the zero mark on interest-bearing cylinder 3 and the date "March 31st" is brought to the observation point, where the exact interest is shown in downward line with the said $90,000.00, thus:

On line "March 31" under _____ $9000000
will be found the interest _____ 88767
and with the decimals covered in turn by the microscopic slide from right to left there will thus also be shown under _____ $900000
    interest _____ 8876
under _____ $90000
    interest _____ 887
under _____ $9000
    interest (cents) _____ 88
under _____ $900
    interest (cents) _____ 8

After the apparatus is once set at any day up to which interest for various amounts is to be computed, the time-calculating is entirely done away with no matter how many the sums and dates. Opposite, or on the lines of, each respective date, under the amount on which the interest is wanted, will be found the exact result. The method as described is particularly of great help, and a great time-saver, in working up the interest on lengthy accounts, to illustrate which more fully, say the interest at 4% per annum on the following account is to be computed up to May 1st, 1918:

| Jan. 4, 1918 | $900.00 |
| Jan. 20, " | 700.00 |
| Feb. 10, " | 4,000.00 |
| Feb. 15, " | 500.00 |
| Mar. 12, " | 800.00 |
| Apr. 3, " | 3,000.00 |

The procedure is:

"May 1" on date cylinder 8 is turned until it reaches the zero mark on interest cylinder 3 when the two cylinders are fixedly connected.

The combined cylinders are then rotated until in turn each of the different dates, on which interest is desired, reaches the fixed or percentage bar 7, under which the exact interest on each of the respective amounts wanted, will be found. Thus:

On line
"Jan. 4"  under  $900.00  will be found  $12.98  int. for  117 days.
"Jan. 20"  "     700.00   "    "    "     7.75   "    "    101   "
"Feb. 10"  "   4,000.00   "    "    "    35.07   "    "     80   "
"Feb. 15"  "     500.00   "    "    "     4.11   "    "     75   "
"Mar. 12"  "     800.00   "    "    "     4.38   "    "     50   "
"Apr. 3"   "   3,000.00   "    "    "     9.20   "    "     28   "

The total of interest amounting to _____ $73.49

While for illustration reference so far has only been made to a single calculated rate of interest (4%) I am enabled by the slight modification shown in Figs. 3 and 4, by the simple turning of an extra hand-wheel on a percentage cylinder and following the procedure already explained, to get results up to, or from, any given time, at any given per cent., on any number of different sums with different dates, without the time having to be computed, the different rates at which interest is to be calculated being limited only by the number of blade percentage indexes (5 blades only being shown in drawing) placed on the percentage-cylinder.

In the position shown in Fig. 3, the blade A is at the observation line, or point, F, and is divided into sections (numbered on drawing but unnecessary in practice) so arranged, that the downward or latitudinal column of the interest cylinder, when placed at the desired date, at the observation point underneath the various sections, will show the interest respectively on any or all of the different principal sums on any of the different blades (which blades virtually are a combination of principal and percentage indexes), the interest for instance at 1% per annum, for one year, for each amount on the said blade A, showing at the observation point F.

Now if it is desired to get 2% on any of the amounts shown on blade A, say on $100.00, the hand-wheel 21 is moved so as to displace blade A and bring blade B to the observation point F.

As the sum of $100.00 is now on the 2nd section of blade B (see dotted line diagram B) instead of the first section as it was shown on blade A, it follows that the interest ($2.00) at the observation point on column 2 of cylinder 3, which on bar A was the interest at 1% per annum on $200.00 now stands as the interest at 2% on $100.00.

To get the interest on the same amount ($100.00) at 3%, the blade C (dotted line diagram C) is brought to the observation point, when the sum mentioned ($100.00) being on the 3rd section of the said blade C will be in downward line with the 3rd column of cylinder 3 showing the interest ($3.00) which originally stood as the interest at 1% on $300.00, as the interest at 3% on $100.00.

To get 4%, the blade D, (dotted line diagram D) is brought to the observation point and the sum of $100.00 being on the 4th section of the said blade D, the interest ($4.00) is shown in the 4th column of cylinder 3.

To get 5%, blade E is brought to the observation point and on the $100.00 the interest ($5.00) is shown in the 5th column of cylinder 3.

The percentage blades on cylinder 16 are preferably bent to the shape shown and their depth is such that they almost touch the surface of cylinder 3 when passing over its highest point, and the said cylinder 16 has at its left end five V-shaped slots, 17, (one for each blade) into which the turned-over end of tension spring 18, secured to standard 20, slides, and holds any particular one of the percentage blades at the observation point.

As, with a microscope, numerals to the amount of 32 to the inch can be practically used, a large number of both principal and interest sums can be employed without extreme lengthening of the apparatus.

What I desire to claim is:

In an interest calculating device in combination, a cylinder having interest indicia, a rotatable cylinder, having attached to its periphery a plurality of blades bearing indicia representing principal sums, each blade corresponding to a definite rate of interest, and such indicia being arranged so that the principal sum values on said blades for increasing interest rates will start at progressively greater distances to the right and will have correspondingly greater interspacings, to produce proper coördination with interest values on said interest indicia bearing cylinder.

Signed at New York city, in the county of New York and State of New York, this the 27th day of May, A. D. 1918.

DAVID JANKOWER.

Witnesses:
J. HART ROBERTSON,
BARTON B. WARD.